Figure 1:
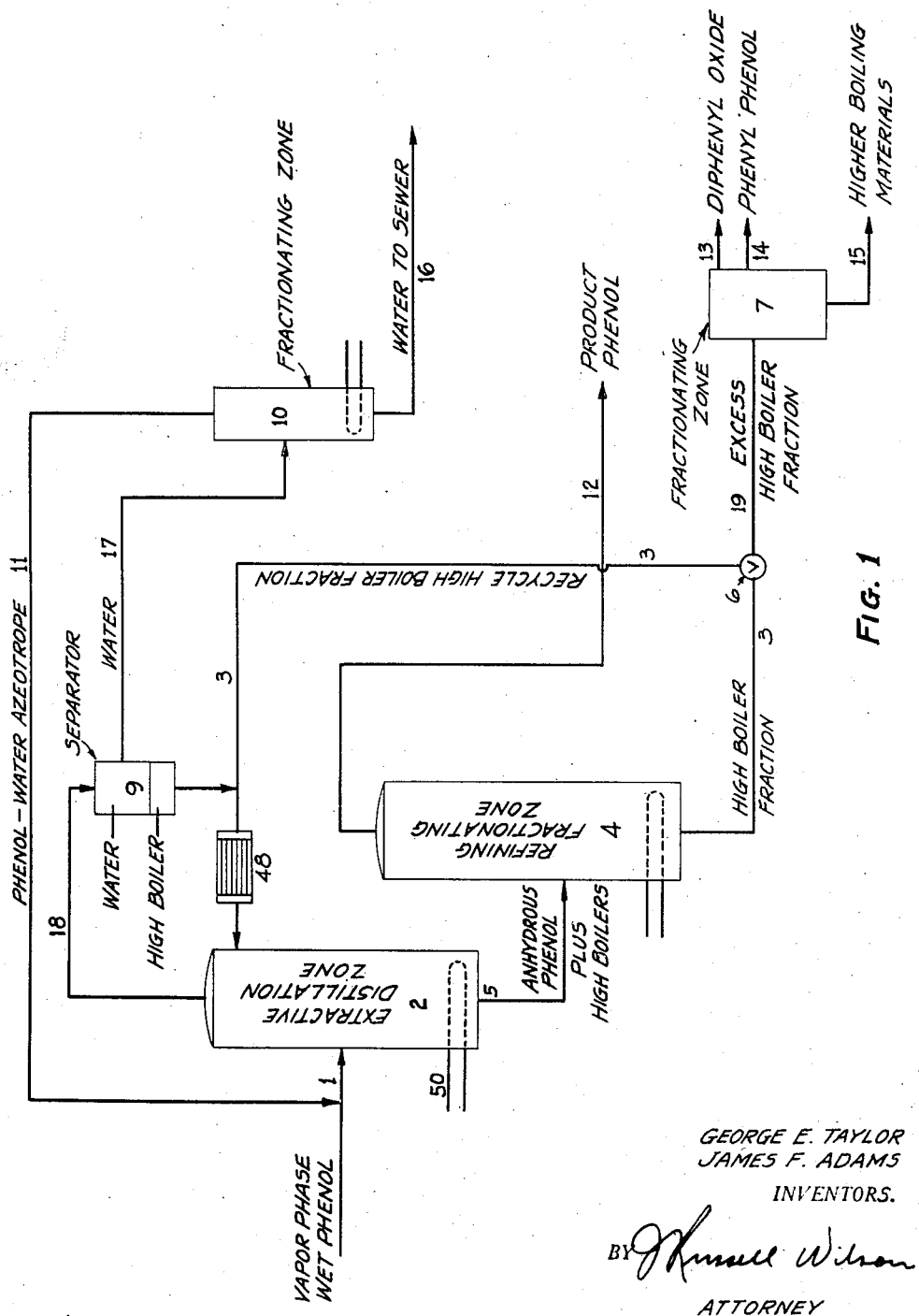

Oct. 25, 1949.　　　G. E. TAYLOR ET AL　　　2,486,342
DISTILLATION PROCESS FOR THE RECOVERY OF PHENOLS
Filed March 7, 1947　　　　2 Sheets-Sheet 2

GEORGE E. TAYLOR
JAMES F. ADAMS
INVENTORS.

BY J. Russell Wilson
ATTORNEY

Patented Oct. 25, 1949

2,486,342

UNITED STATES PATENT OFFICE 2,486,342

DISTILLATION PROCESS FOR THE RECOVERY OF PHENOLS

George Edward Taylor and James Franklin Adams, St. Louis, Mo., assignors to Monsanto Chemical Company, St. Louis, Mo., a corporation of Delaware Application March 7, 1947, Serial No. 733,070

7 Claims. (Cl. 202—40)

This invention relates to a process for the refining of wet crude phenols. More particularly, this invention relates to the separation of phenols and ethers from aqueous mixtures of water, phenols, and aromatic ethers which are the final reaction mixtures of many of the processes for the manufacture of phenols, and more specifically, to the recovery of phenols from azeotropic mixtures of phenols and water.

It is now the practice to pass the crude phenol containing substantial amounts of water to a dehydration rectification zone and withdraw an overhead fraction which is substantially an azeotropic mixture of water and phenol and a bottom fraction which is substantially anhydrous crude phenol. The anhydrous crude phenol is subsequently passed to a rectifying zone and separated into pure phenol which is removed as the overhead fraction and a "high-boiler" fraction or "bottoms," which usually contains 30 to 50% diphenyl ether, 30 to 40% phenyl phenol, 5 to 15% phenyl diphenyl ether, and 1 to 5% high boiling tars.

The mixture of water and phenol which is removed as the overhead fraction from the dehydration zone is substantially a phenol-water azeotrope containing about 10% phenol; although the composition of the phenol-water fraction may at times vary from a true azeotropic composition, for convenience, the water-phenol mixtures will be herein referred to as azeotropic, as this invention is particularly applicable to separation of the phenol from the constant boiling mixtures of phenol and water, which azeotropic mixtures are not separable into their respective components by straightforward rectification.

It is the practice to recycle the phenol-water azeotropes to various stages of the phenol manufacturing process and not to attempt to separate these azeotropic mixtures into the phenol and water components. However, in many processes it is impractical to recycle these azeotropes and, inasmuch as the amounts of azeotropic mixtures are large and the per cent of phenol in such mixtures is substantial, commercial economy requires that the phenol be recovered from the azeotropic or other aqueous mixtures before the water is disposed of. When it is necessary or desirable to recover phenol from dilute water or azeotropic mixtures, it is common practice to scrub the vaporous mixtures with a caustic solution; also, it has been proposed to subject the liquid phase water-phenol mixture to a liquid-phase extraction with a preferential solvent for phenol such as tricresyl phosphate. Other methods have utilized the principle of azeotropic distillation of the mixture using a third component such as a petroleum-naptha to form an azeotrope with the water, removing a water-naptha azeotrope as the overhead fraction and removing substantially anhydrous phenol as the bottom fraction from the azeotropic distillation process.

These processes for separating the components of the azeotropes each have their respective disadvantages, for example, when the phenol is scrubbed out with caustic, the phenate liquor has to be concentrated and recycled to the manufacturing process. However, in many processes it is impractical to recycle the phenate liquor to the process just as it is impractical to recycle the azeotrope; and therefore it is more desirable to recover the phenol as such. Emulsion problems are encountered in the liquid-phase solvent extraction method, making it difficult to obtain sharp phase separation; and both the use of the liquid-phase solvent extraction and azeotropic distillation using a third component necessitate the additional expense involved in the cost of the additional solvents or azeotrope-forming materials and also results in the introduction of additional foreign materials into the phenol process.

It is an object of this invention to provide new steps in the process for the recovery of phenol, higher boiling phenols and aromatic ethers which make up the reaction product mixtures of processes for the manufacture of phenol. A further object is to provide a new process for recovery of phenols from aqueous mixtures of phenol. It is also an object of this invention to provide a new process for the separation and recovery of phenols from azeotropic mixtures of water and phenols, which mixtures are not separable into their components by means of straightforward rectification. A still further object is to provide new steps in a cyclic process for the recovery of phenols from the reaction product mixtures from processes for the manufacture of phenol, wherein the aqueous mixtures of phenols are subjected to an extractive distillation using the higher boiling phenols and ethers which are the co-products of the phenol manufacturing process as the liquid preferential solvents for the phenol within the extractive distillation zone.

We have discovered a method for separating phenol from constant boiling mixtures, or other aqueous mixtures, of water and phenol, and according to our invention when an azeotropic or other aqueous mixture of phenol is passed, in the vapor phase, through an extractive distillation zone having a liquid phase solvent reflux, which is a preferential absorbent for phenol, comprising the "high boilers" from the phenol refining still, or fractionated components thereof, the overhead fraction will contain all of the water which was present in the aqueous mixture of phenol and water with but very small amounts of phenol and "high boiler"; and, the bottom fraction will be comprised of the recycled "high boiler" solvent having dissolved therein the phenol and any other "high boilers" which may have been present in the aqueous solution of phenols. These "high boilers" are present in aqueous mixtures by reason of being the co-products of the phenol manufacturing process and are comprised of higher boiling phenols and aromatic ethers such as phenyl phenol, diphenyl ether and phenyl diphenyl ether.

This bottom fraction comprising the phenol dissolved in the "high boiler" is passed through a rectifying zone wherefrom the phenol is withdrawn as the overhead fraction and the "high boiler" or bottom fraction is withdrawn and recycled to the extractive distillation zone, to serve as the liquid preferential solvent for the vaporized phenols and ethers.

The embodiments, processes and variations of our invention may be readily understood by referring to the attached drawings which illustrate various continuous cyclic processes which may be used in conjunction with this invention. It is understood that this invention has many variations and applications beyond those suggested in the illustrations and, therefore, it is not intended that this invention be limited to the described applications, modifications and examples.

In Figure 1, the vaporized phenol reaction mixture from the phenol manufacturing process, comprising steam, phenol and higher boiling phenols and ethers, is introduced into an extractive distillation zone 2 by means of a feed line 1. Within the extractive distillation zone 2 is a liquid phase solvent reflux comprising the higher boiling phenols and aromatic ethers from the refining fractionating zone 4 which are recycled from zone 4 to zone 2 by means of line 3. The extractive distillation zone 2 may be a conventional bubble cap column having bubble caps and trays with the liquid phase reflux of higher boiling phenols and ethers thereon, or it may be a conventional rectifying type packed column with the "high boiler" solvent reflux descending among the packing, countercurrent to the vaporized mixture of phenols, ethers and water. At the bottom of extractive distillation zone 2 is a heating means 50 to maintain the liquid "high boiler" solvent with the phenols and ethers dissolved therein at a temperature of 110° to 150° C. to prevent the condensation of the water vapor within the extractive distillation zone.

The bottom fraction from extractive distillation zone 2 comprises the "high boiler" which has been recycled from fractionating zone 4, having dissolved therein the phenol and any higher boiling phenols and ethers introduced into zone 2 by means of line 1, and this bottom fraction is passed to the refining fractionating zone 4 by means of line 5. The overhead fraction from fractionating zone 4 is substantially pure phenol and is removed by line 12, while the bottom fraction comprising the "high boilers" is recycled to zone 2 by means of line 3, to be used as the solvent reflux for the extractive distillation zone 2.

Item number 48 is a heat exchange means for maintaining the temperature of the "high boiler" solvent reflux between 110° and 150° C. This optimum temperature range is hereinafter discussed.

Inasmuch as the "high boilers" steadily accumulate and more "high boilers" are produced than are required for recycling to extractive distillation zone 2, a portion of this high boiler fraction may be continuously removed by means of a valve arrangement 6, and this excess high boiler is passed to a rectifying zone 7 and fractionated into diphenyl ether, phenyl phenol and high-boiling materials.

Referring to extractive distillation zone 2, the water, which is introduced by means of line 1 as steam in the vapor mixture of steam, phenol and higher boiling phenols and ethers, is removed as the overhead from zone 2, is cooled and collected in a separator 9 so that the small amount of "high boilers" which steam distill with the water may be separated from the water due to their insolubility in water and returned to zone 2 as a part of the "high boiler" solvent. The water from the separator 9, depending upon the efficiency of the extractive distillation zone 2 will usually contain less than five-tenths per cent phenol and, in most cases, less than two-tenths per cent phenol. If it is uneconomical to send this small amount of phenol to the sewer along with the water, this water may be further rectified in fractionating zone 10 and this small amount of phenol recovered substantially as an azeotrope which may be recycled to zone 2 by means of lines 11 and 1. The water separated from the phenol in fractionating zone 10 is passed to the sewer.

This process will result in the substantially complete removal of all the phenols which may be present in azeotropic or other aqueous mixture of phenols.

Figure 2:
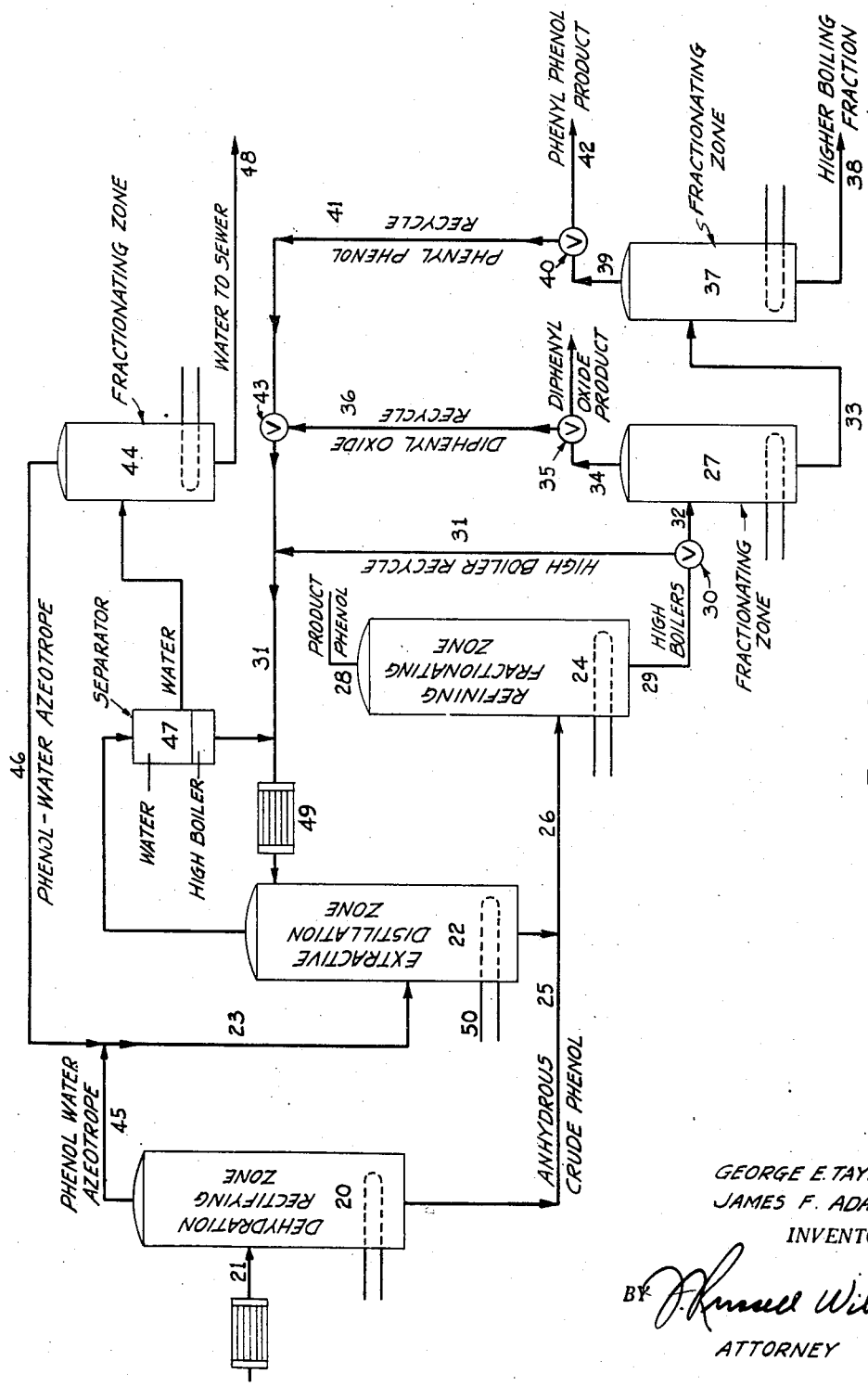

Figure 2 illustrates modifications of our phenol refining process wherein a dehydration rectifying zone is added to the process described in Figure 1, and also provisions for recycling a fractionated portion of the high boiler fraction in place of or in addition to the high boiler mixture, if so desired. In these modifications the said wet crude phenol from the manufacturing process is introduced, by means of line 21, into the dehydration rectifying zone 20 from which the water is removed as an overhead fraction comprising approximately a 10% phenol-water azeotrope and this azeotrope is passed to the extractive distillation zone 22 by means of line 23. After the introduction of the azeotrope into extractive distillation zone 22, the preferential absorption of the phenols and ethers takes place by means of extractive distillation using the refining still high boilers, or a fractionated portion thereof, as the solvent reflux, in a similar manner as described for Figure 1.

The anhydrous crude phenol from the dehydration zone 20 is combined with the high boiler solvent-phenol mixture from extractive distillation zone 22 and passed by means of lines 25 and 26 to the refining fractionating zone 24. The overhead from refining fractionating zone 24 is substantially pure product phenol and is removed by means of line 28. The higher boiling phenols and ethers are removed as a liquid high boiler fraction from the refining fractionating zone 24 by means of line 29 and the required portion is recycled, by means of valve arrangement 30 and line 31, through the heat exchange means 49 to the top of extractive distillation zone 22. Heat exchange means 49 is necessary to maintain the temperature of the recycled "high boilers" at 110° to 150° C.

The excess of the high boiler fraction over that necessary for the solvent reflux in extractive distillation zone 22 is directed by means of valve arrangement 30 and line 32 to fractionating zone 27. The overhead from fractionating zone 27 is substantially diphenyl oxide. This diphenyl oxide fraction may be recycled, by means of valve arrangements 35 and 43 and lines 36 and 31, through the heat exchange means 49 to the upper part of extractive distillation zone 22 in place of or in addition to the high boiler fraction as it comes from the refining zone 24. That portion of the diphenyl oxide fraction which is not necessary to the phenol recovery system may be removed from the system by means of valve arrangement 35. The bottom fraction from fractionating zone 27 comprising phenyl phenol, phenyl diphenyl ether and high boiling tars may be passed to fractionating zone 37 by means of line 33. The overhead from fractionating zone 37 is substantially phenyl phenol and a liquid mixture of phenyl diphenyl ether and high boiling tars is removed as the bottom fraction from fractionating zone 37. The phenyl phenol fraction may be recycled, by means of valve arrangements 40 and 43 and lines 39, 41 and 31, through the heat exchange means 49 to the upper part of extractive distillation zone 22 in place of or in addition to the high boiler fraction as it comes from fractionating zone 24 or the diphenyl oxide fraction from fractionating zone 27. That portion of the phenyl phenol which is not required as a part of the solvent reflux in extractive distillation zone 22 may be removed from the system by means of valve arrangement 40 and line 42. The mixture of phenyl diphenyl ether and high boiling tars is removed from the phenol recovery system by means of line 38.

The water which is introduced into the extractive distillation zone 22 as steam in the vaporized phenol-water azeotropic mixtures from zones 20 and 44 is removed in the overhead fraction from extractive distillation zone 22, and is cooled and collected in a separator 47 so that the small amount of "high boiler" or "high boiler" fraction which steam distills with the water may be separated from the water, due to its water insolubility, and returned to zone 22 as part of the high boiler solvent reflux.

The water from the separator 47, depending upon the efficiency of the rectifying zone 22, will usually contain less than five-tenths per cent phenol and, in most cases, less than two-tenths per cent phenol. If it is uneconomical to send this small amount of phenol to the sewer along with the water, this very dilute water-phenol mixture may be rectified in fractionating zone 44 and the small amount of phenol recovered as an azeotrope which may be recycled to zone 22 by means of lines 46 and 23, and the rest of the water discharged to the sewer by means of line 48.

This process will result in the substantially complete removal of the phenols and ethers which are present in the wet crude phenol mixture which enters the system at 21.

The practicability and utility of this invention are illustrated by the following example; however, it is not intended that this invention be limited to the embodiments of this example, as other applications will be readily apparent to those skilled in the art of phenol recovery or refining.

An aqueous solution containing approximately 68% water, 30% phenol and 2% high boilers from a process for the production of phenol by the sulfonation of benzene was introduced to a continuous refining process such as is illustrated in Figure 2. The aqueous phenolic solution was admitted to a dehydration rectification column as indicated by item 10 of Figure 2.

The overhead fraction was substantially an azeotropic mixture of water and phenol, analyzing 88.3% water and 11.7% phenol, the bottom fraction was substantially anhydrous crude phenol analyzing 93% phenol and 7% high boilers and was passed to a refining rectification column, and separated into substantially pure phenol and a "high boiler" fraction. The azeotrope from the dehydration step was passed to an extractive distillation rectifying zone comprising a packed column equivalent to 8 theoretical plates, and a liquid phase solvent reflux consisting of the high boiler fraction from the refining still.

The temperature of the column was maintained at 110° C. and the temperature of the "high boilers" was adjusted to 110° C. before being introduced into the column as the solvent reflux for extracting the phenol. The temperature must be maintained above 100° C. to prevent condensation of the azeotrope but preferably below 150° C., as the higher temperature results in increased steam distillation of the high boiler and, therefore, the overhead fraction would contain greater amounts of the "high boiler" in addition to the water. We have found that 110° C. is very satisfactory.

The reflux ratio of high boiler within the column was maintained at 5 volumes of high boiler per volume of overhead fraction collected, although a desirable range is 3 to 7 volumes of reflux per volume of overhead fraction and the process will be operable when 2 to 10 volumes of solvent reflux are employed per volume of overhead.

The overhead fraction from the extractive distillation column was collected in a separator, where it separated into layers indicating a ratio of 93 volumes of water to 7 volumes of high boiler, the high boiler being recycled to the extractive distillation column.

The water layer was analyzed and found to contain approximately, but less than, 0.2% by weight of phenol.

The water layer was again fractionated, corresponding to item 44 of Figure 2, and it was shown that all the phenol remaining in the water layer had been distilled as an azeotrope when only 2-3% of the layer had been removed as overhead and, therefore, the remaining 98-97% of the water contained substantially no phenol, and could be sent to the sewer with no appreciable loss of phenol. This azeotrope may be recovered and recycled to the extractive distillation zone.

While dehydration of the aqueous mixture of reaction products from processes for the manufacture of phenol and in particular, the separation of phenol and water from phenol-water azeotropes, have been used to illustrate the process of this invention, the process of this invention is also adaptable to the dehydration of the aqueous mixtures of reaction products from the processes for the manufacture of cresol wherein the higher boiling cresols and aromatic ethers which are inherent in the reaction products from the processes for the manufacture of cresol may be used as the preferential solvent for the stripping of the cresol from the azeotropic mixtures of cresol and water such as are obtained from the dehydration of the crude cresol reaction mixtures. Likewise the higher boiling xylenols and aromatic ethers which are inherent in the reaction mixtures from the processes for the manufacture of xylenol may be used as the preferential solvent for the stripping of the xylenol from the azeotropic mixtures of xylenol and water such as are obtained from the dehydration of the crude xylenol reaction mixtures from the processes for the manufacture of xylenol.

We claim:

1. In a process for the recovery of phenol, higher boiling phenols and aromatic ethers from a mixture of said phenols, ethers and water, the steps comprising passing a vaporized mixture of said phenols, ethers and water into an extractive distillation zone and permitting the vapors to pass upwards and countercurrent to a liquid solvent comprising a mixture of said higher boiling phenols and ethers comprising predominantly phenyl phenol and diphenyl ether to effect a preferential absorption of the said phenols and ethers in said liquid solvent; removing the extracted water vapor from the upper part of said zone and removing from the lower part of the extractive distillation zone said solvent having dissolved therein substantially all of said phenols and ethers introduced into said extractive distillation zone as said vaporized mixture of phenols, ethers and water; passing said solvent and dissolved phenols and ethers into a fractionating zone, removing substantially pure phenol as an overhead fraction from said fractionating zone and removing from the bottom part of said fractionating zone a liquid mixture of said higher boiling phenols and ethers comprising predominantly phenyl phenol and diphenyl ether, and recycling a part of said higher boiling phenols and ethers to the upper part of said extractive distillation zone for use as the said liquid solvent therein.

2. In a process for the recovery of phenol, the higher boiling phenols and aromatic ethers from a mixture comprising phenol, phenyl phenol, diphenyl ether, phenyl diphenyl ether and water, the said mixture comprising the crude reaction-product mixture of a process for the synthesis of phenol from benzene, the steps comprising passing a vaporized mixture of said phenols, ethers and water into an extractive distillation zone wherein the vaporized mixture is contacted with a countercurrent liquid solvent reflux comprising a mixture of said higher boiling phenols and ethers comprising predominantly phenyl phenol and diphenyl ether recycled from a phenol refining fractionating zone to the upper portion of the extractive distillation zone for use as the liquid phase solvent and reflux therein, thereby effecting a preferential absorption of said phenols and ethers in said solvent reflux; withdrawing the extracted water vapor from the upper portion of said extractive distillation zone; withdrawing from the lower portion of said extractive distillation zone the said solvent reflux with said phenols and ethers dissolved therein; subsequently fractionating said solvent reflux with said phenols and ethers dissolved therein in a fractionating zone, withdrawing substantially pure phenol as an overhead fraction from said fractionating zone and withdrawing from the lower portion of said fractionating zone a liquid mixture of said higher boiling phenols and ethers comprising predominantly phenyl phenol and diphenyl ether and recycling a portion of the liquid mixture of said higher boiling phenols and ethers to the upper part of said extractive distillation zone for use as the liquid solvent reflux therein.

3. In a process for the recovery of phenol, higher boiling phenols and aromatic ethers from a mixture of said phenols, ethers and water comprising the crude reaction-product mixture of a process for the synthesis of phenol from benzene, the steps comprising passing a vaporized mixture of said phenols, ethers and water into an extractive distillation zone and permitting the vapors to pass upwards and countercurrent to a liquid solvent comprising a mixture of said higher boiling phenols and ethers to effect a preferential absorption of the said phenols and ethers in said liquid solvent, removing the extracted water vapor from the upper part of said zone and removing from the lower part of the extractive distillation zone said solvent having dissolved therein substantially all of said phenols and ethers introduced into said extractive distillation zone as said vaporized mixture of phenols, ethers and water; passing said solvent and dissolved phenols and ethers into a fractionating zone, removing substantially pure phenol as an overhead fraction from said fractionating zone and removing from the bottom part of said fractionating zone a liquid mixture of said higher boiling phenols and ethers, and recycling a part of said higher boiling phenols and ethers to the upper part of said extractive distillation zone for use as the solvent therein; said higher boiling phenols and ethers comprising predominantly the higher boiling phenyl phenol and diphenyl ether co-products of the phenol manufacturing process.

4. In a process for the recovery of phenol from a substantially azeotropic mixture of phenol and water, the steps comprising passing a vaporized substantially azeotropic mixture of said phenol and water into an extractive distillation zone and permitting the vapors to pass upwards and countercurrent to a liquid solvent comprising a mixture of higher boiling phenols and ethers said higher boiling phenols and ethers being predominantly phenyl phenol and diphenyl ether to effect a preferential absorption of the said phenol in said liquid solvent, removing the extracted water vapor from the upper part of said zone and withdrawing from the lower part of the extractive distillation zone said liquid solvent having dissolved therein substantially all of the said phenol of said vaporized substantially azeotropic mixture of phenol and water introduced into the extractive distillation zone; passing said solvent and dissolved phenol into a fractionating zone, removing substantially pure phenol as an overhead fraction from said fractionating zone and withdrawing from the lower part of said fractionating zone a liquid mixture of said higher boiling phenols and ethers comprising predominantly phenyl phenol and diphenyl ether, and recyling a part of said higher boiling phenols and ethers to the upper part of said extractive distillation zone for use as the countercurrent liquid solvent therein.

5. In a process for the recovery of phenol, higher boiling phenols and aromatic ethers from a mixture of said phenols, ethers and water comprising the crude reaction products of a process for the manufacture of phenol, the steps comprising passing a vaporized substantially azeotropic mixture of phenol and water into an extractive distillation zone wherein said vaporized mixture of phenol and water is contacted with and passed countercurrent to a liquid selective absorbent for phenol comprising a mixture of said higher boiling phenol and aromatic ether co-products of a phenol manufacturing process comprising predominantly phenyl phenol and diphenyl ether recycled from a phenol refining fractionating zone to the upper portion of said extractive distillation zone for use therein as the selective absorbent for phenol, thereby effecting a preferential absorption of the said phenol in said liquid selective absorbent; removing the extracted water vapor from the upper portion of said zone and removing from the lower part of the extractive distillation zone said liquid selective absorbent having dissolved therein substantially all of the said phenol introduced into said extractive distillation zone as said vaporized azeotropic mixture of phenol and water; passing said liquid selective absorbent and dissolved phenol into a fractionating zone, withdrawing substantially pure phenol as an overhead fraction from said fractionating zone and removing from the bottom part of said fractionating zone a liquid mixture of said higher boiling phenols and ethers comprising predominantly phenyl phenol and diphenyl ether, recycling a portion of said higher boiling phenols and ethers to the upper part of said extractive distillation zone for use as the liquid selective absorbent therein.

6. In a process for the recovery of phenol, higher boiling phenols and aromatic ethers from a mixture of said phenols, ethers and water comprising the crude reaction-product mixture of a process for the manufacture of phenol, the steps comprising passing a vaporized mixture of phenol and water into an extractive distillation zone wherein the vaporized mixture is contacted with a countercurrent liquid solvent reflux comprising a mixture of said higher boiling phenols and ethers comprising predominantly diphenyl ether and phenyl phenol recycled from a phenol refining fractionating zone to the upper portion of said extractive distillation zone for use as the liquid solvent and reflux therein, thereby effecting a preferential absorption of said phenol in said solvent reflux; withdrawing the extracted water vapor from the upper portion of said extractive distillation zone, and withdrawing from the lower portion of said extractive distillation zone, the said solvent reflux with said phenol dissolved therein; subsequently fractionating said solvent reflux with said phenol dissolved therein in a fractionating zone, withdrawing substantially pure phenol as an overhead fraction from said fractionating zone and withdrawing from the lower portion of said fractionating zone a liquid mixture of said higher boiling phenols and ethers comprising predominantly phenyl phenol and diphenyl ether, recycling a portion of the liquid mixture of said higher boiling phenols and ethers to the upper part of said extractive distillation zone for use as the liquid solvent reflux therein, and removing the unrecycled portion of the said liquid mixture of higher boiling phenols and ethers from the system.

7. In a process for the recovery of phenol, higher boiling phenols and aromatic ethers from a mixture of said phenols, ethers and water comprising the crude reaction products of a process for the manufacture of phenol from benzene, the steps comprising passing the said mixture of phenols, ethers and water into a first fractionating zone, and withdrawing from said first fractionating zone a phenol-water mixture as the overhead fraction and withdrawing as another fraction from the first fractionating zone substantially anhydrous crude phenol comprising phenol, higher boiling phenols, aromatic ethers comprising predominantly diphenyl ether, and tars; passing the said anhydrous crude phenol into a second fractionating zone and withdrawing therefrom substantially pure phenol as an overhead fraction, and withdrawing a liquid mixture of said higher boiling phenols and ethers comprising predominantly phenyl phenol and diphenyl ether from the lower part of said second fractionating zone; passing the vaporized phenol-water mixture withdrawn as the overhead fraction from the said first fractionating zone into an extractive distillation zone and countercurrently contacting within said extractive distillation zone a liquid selective absorbent for phenol comprising a portion of the said higher boiling phenols and ethers withdrawn from the lower part of said second fractionating zone and recycled to the upper part of said extractive distillation zone to serve as the said liquid selective absorbent in said extractive distillation zone, thereby effecting the absorption of said phenol in said liquid selective absorbent; withdrawing extracted water vapor from the upper part of said extractive distillation zone and withdrawing from the lower part of said extractive distillation zone said liquid selective absorbent having dissolved therein the phenol of said vaporized phenol-water mixture introduced in said extractive distillation zone; passing said liquid selective absorbent with the said phenol dissolved therein to a third fractionating zone, withdrawing substantially pure phenol as one fraction from said third fractionating zone, withdrawing from the lower part of said third fractionating zone a liquid mixture of said higher boiling phenols and ethers comprising predominantly phenyl phenol and diphenyl ether, and recycling a portion of said higher boiling phenols and ethers to the upper part of said extractive distillation zone for use as the selective absorbent therein and removing the unrecycled portion of said higher boiling phenols and ethers from the system.

GEORGE EDWARD TAYLOR.
JAMES FRANKLIN ADAMS.

REFERENCES CITED

The following references are of record in the file of this patent:

UNITED STATES PATENTS

| Number | Name | Date |
| --- | --- | --- |
| 2,056,748 | Taylor | Oct. 6, 1936 |
| 2,073,248 | Molinari | Mar. 9, 1937 |
| 2,107,265 | Archibald | Feb. 8, 1938 |
| 2,209,150 | Byrns | July 23, 1940 |
| 2,286,056 | Bown | June 9, 1942 |
| 2,290,636 | Deanesly | July 21, 1942 |
| 2,322,881 | Pollock | June 29, 1943 |
| 2,339,160 | Dunn et al. | Jan. 11, 1944 |